3,202,482
PURIFICATION OF HELIUM CONTAMINATED BY NITROGEN
Charles A. Herster, Elmhurst, N.Y., assignor to Heli-Chem Products, Inc., a corporation of Delaware
Filed Jan. 11, 1962, Ser. No. 165,574
4 Claims. (Cl. 23—209)

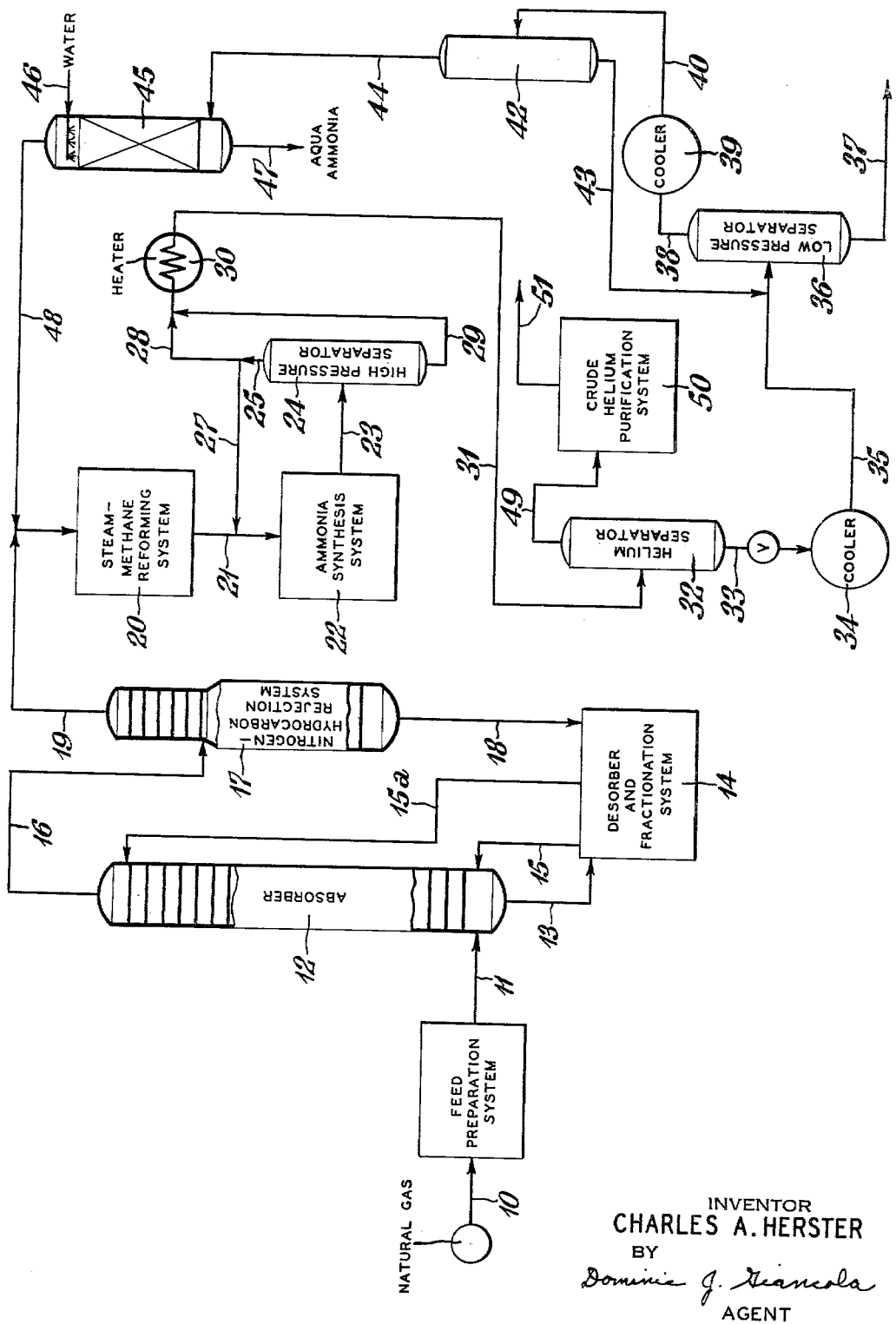

This application is a continuation-in-part of application Serial No. 807,345, filed in the name of Charles A. Herster, April 20, 1959, and now abandoned.

This invention relates to the separation of inerts from a gasiform mixture. In a particular aspect, this invention relates to the concentration of helium contained in natural gas.

Development of large-scale helium production operations since World War I is an interesting phase of chemical industrial growth. Of particular interest is the method of production in which helium is extracted in certain helium-bearing natural gases by processing at very low temperatures and relatively high pressures. Most of the helium has been produced by a method developed and used by the United States Bureau of Mines. Other methods have been developed but have not been used extensively for large-scale production.

Accordingly, it is a main object of the present invention to provide a convenient and improved method of recovering helium from a gasiform mixture.

Other objects and advantages of the present invention will become apparent from the accompanying description and disclosure.

It has been discovered that helium contained in a gaseous mixture which is substantially composed of nitrogen and hydrocarbons can be concentrated by process steps which comprise contacting the helium-containing gas mixture with liquid hydrocarbon oil in an absorption zone to remove higher hydrocarbons and a substantial portion of methane from the gas stream, cooling and fractionating said gas stream to remove a substantial portion of the nitrogen component and reduce the hydrocarbon content to a minor amount of methane in the gas stream, subjecting said gas stream to steam reforming conditions to increase the hydrogen content of the gas stream, contacting said gas stream with ammonia synthesis catalyst under conditions producing liquid ammonia, and flashing the liquid ammonia to recover the helium dissolved therein.

The drawing is a diagrammatic representation of a process system adapted for the practical application of the invention.

Referring to the drawing, the invention will be more fully explained as applied to the recovery of helium from natural gas. Raw gas from a natural gas source composed of approximately 14.0 to 17.0 percent nitrogen, 85.0 to 82.0 percent hydrocarbons and 0.3 to 0.7 percent helium is entered into a feed preparation unit through line 10. The gas enters a knockout drum to remove miscellaneous liquids and pipeline solids, and then is entered into a purification apparatus where it is contacted with monoethanolamine to remove carbon dioxide and hydrogen sulfide. Usually, the monoethanolamine treatment is followed by an aqueous sodium hydroxide wash step to completely remove all traces of these compounds. The gas is separated from the caustic solution and contacted with water in a water wash drum to remove traces of entrained caustic. The gas is dried, compressed and then passed through a cooler to remove the heat of compression that is produced.

The cooled gas, which may or may not contain condensed materials, is passed through line 11 into absorber tower 12 where the gas is contacted with a lean oil which is substantially liquid propane. The lean oil selectively absorbs methane and heavier gases. Intercoolers are provided to remove a portion of the heat of absorption so as to avoid an excessive rise in the temperature of the absorption oil flowing down the tower.

Liquid from absorber tower 12, consisting of condensed material from the feed gas plus the rich oil, passes through line 13 by gravity or pumping to a desorber system 14. Here the addition of heat by a reboiler at the base of the desorber tower, combined with the desired number of fractionation trays, permits the selective desorption from this liquid of the small quantities of nitrogen, hydrogen and helium which are picked up in absorber tower 12 when methane absorption is set at some practical level, such as 75 percent absorption. The stripped desorbed vapors pass through line 15 into absorber tower 12 of the absorption system. The desorber bottoms is entered into a de-ethanizer preheater wherein heat is removed from the pipeline feed gas. The de-ethanizer feed is then passed into the de-ethanizer. In the de-ethanizer, most of the methane and ethane, and some of the propane in the de-ethanizer feed are passed overhead as a vapor stream. This stream is entered into a condenser where cooling is applied to provide adequate liquid for reflux which is separated from the non-condensed vapor in a reflux drum and returned to the de-ethanizer tower. The overhead product vapor is entered into an exchanger to abstract heat from pipeline feed gas, and is then sent to the pipeline or another process unit, as required.

The de-ethanizer tower produces a bottoms product which contains little ethane and substantially all of the propane, butane and heavier hydrocarbons contained in the desorber bottoms. Stripping vapor is produced in the de-ethanizer tower by a reboiler. Bottoms product flows from the de-ethanizer tower into a depropanizer tower.

The depropanizer tower produces an overhead product of ethane, propane and a small quantity of butane. Part or all of this material is refrigerated and returned to absorber tower 12 as a source of lean oil.

Gross overhead vapor from the depropanizer is entered into a condenser where it is totally condensed and withdrawn and then passed into a reflux drum. Reflux from the drum is returned to the depropanizer tower. Lean oil is withdrawn from the reflux drum, refrigerated and pumped to absorber tower 12. There may be excess overhead material after satisfying the lean oil requirement, or additional lean oil may be needed depending upon the level of methane recovery at which the system is operating.

Net product propane is passed into storage. If make-up propane is required, then it is obtained from the storage source.

Bottoms product from the depropanizer, containing a small amount of propane plus most of the butanes and heavier hydrocarbons in the feed gas, is cooled and passed into storage.

Absorber tail gas is withdrawn from absorber tower 12 and entered into nitrogen-hydrocarbon rejection system 17 through line 16. The gas stream is divided into two portions. The first portion of the gas is entered into an exchanger and loses heat to bottoms product from the nitrogen-methane balancing unit of rejection system 17. The second portion of the gas is passed through an exchanger which is the reboiler for the balancing unit nitrogen tower. Cooled gas from the two exchangers are combined and entered into another exchanger where heat is removed by nitrogen tower overhead product. The gas is then passed into another exchanger where final cooling is effected by refrigeration. The cooled gas is entered into the nitrogen tower. Gross overhead vapor from the nitrogen tower is passed into a condenser where sufficient reflux liquid is condensed to effect the desired separation. The vapor-liquid mixture is then entered into a reflux drum. The liquid from the drum is pumped to the top of the nitrogen tower to provide reflux. The vapor separated in the reflux drum is entered into the exchangers described above. The resultant gas is withdrawn from the nitrogen-hydrocarbon rejection system 17 through line 19 and entered into steam-methane reforming system 20.

The nitrogen tower bottoms is passed through the two exchangers described above. The heated bottoms is withdrawn as a gas and returned to the pipeline or to another processing unit as required.

In steam-methane reforming system 20, methane is converted to hydrogen with by-product carbon dioxide in the presence of steam. The product gas from the reforming system after carbon dioxide removal and methanation is suitable as an ammonia synthesis feed gas.

The nitrogen tower overhead product is joined with steam and the mixture is combined with ammonia synthesis system 22 helium-nitrogen-hydrogen recycle coming through line 48. The resultant mixture is heated in an exchanger and entered into the steam reforming furnace. Here, in the presence of nickel-containing catalyst, the methane reacts with water to form hydrogen, carbon monoxide and carbon dioxide. The reformed gas is passed through a waste heater boiler wherein steam is generated and the gas is quenched. The cooled gas is entered into a shift reactor where, in the presence of added steam and promoted-iron catalyst, the carbon monoxide is converted to carbon dioxide which thereby produces further amounts of hydrogen. The gas from the shift reactor is then passed into a steam boiler for heat recovery. The cooled gas from the steam boiler is entered into an absorber tower where it is contacted with monoethanolamine solution to remove carbon dioxide.

The monoethanolamine treatment system usually includes regeneration facilities such as that described below. Rich monoethanolamine (monoethanolamine plus absorbed carbon dioxide) is withdrawn from the bottom of the ethanolamine absorber tower and entered into a lean amine-rich amine exchanger. The heated rich amine is then entered into a stripper tower. Here the addition of heat by reboiler provides the means of stripping carbon dioxide from the rich amine. The stripped vapors from the stripper tower are passed through an exchanger where heat is removed. The cooled stripper gas is entered into an overhead drum where condensed amine is separated from carbon dioxide. The carbon dioxide vapor is withdrawn from the overhead drum and sent to storage or other processing unit. Condensed amine and water is withdrawn from the overhead drum and flows back to the stripper tower. The stripped amine which is the bottoms product from the stripper tower is entered into the lean amine-rich amine exchanger mentioned above. This cooled lean amine is withdrawn, further cooled in another exchanger and then charged to the ethanolamine absorber tower. The treated gas is withdrawn overhead from the ethanolamine absorber tower as vapor and passed to a methanation system. In the methanation system the small amounts of carbon monoxide remaining after reaction in the reformer shift converter and of carbon dioxide not removed by monoethanolamine treatment are converted to methane by reaction with hydrogen previously produced in steam-methane reforming system 20. The product gas after water removal is suitable as ammonia synthesis feed gas.

The ethanolamine absorber tower tail gas is passed through a methanation feed-effluent exchanger and then entered into a heater. The heated gas is withdrawn and passed into a reactor where carbon monoxide and carbon dioxide are reacted with hydrogen to form methane and water in the presence of a nickel-containing catalyst. The methanated gas is passed through the feed-effluent exchanger mentioned above where it is cooled and most of the water is condensed. The cooled gas from the exchanger is further cooled in another exchanger and then passed into a drum where condensed water is separated from the gas stream. The water that is withdrawn from the drum is either sent to storage or employed in another service. The cooled gas withdrawn from the drum is passed through a multistage compressor which includes intercoolers, after-coolers and connected piping and drums. The compressed gas is then passed through an oil filter where traces of entrained lubricating oil from the compressor are removed from the gas stream. The gas is withdrawn from the compressor system and passed through line 21 to ammonia synthesis system 22.

In ammonia synthesis system 22 the synthesis effluent gas is withdrawn through line 23 and entered into high pressure separator 24. In the high pressure separator, the vapor is disengaged from the liquid and passed out through line 25 where it is split into two separate streams.

The first stream passes through line 27 to a recycle compressor and then the compressed stream is combined with feed gas coming from steam-methane reforming system 20 and entered into the ammonia synthesis reactor where it is subjected to ammonia synthesis conditions such that nitrogen and hydrogen are reacted in the presence of ammonia synthesis catalyst. The ammonia synthesis reactor effluent is passed into a condenser where it is cooled by water. It is then withdrawn and entered into high pressure separator 24, thus completing this circuit. The quantity of this recycle portion of high pressure separator vapor may be adjusted to modify the hydrogen-nitrogen ratio in the ammonia converter such that optimum reaction conditions are achieved at a relatively high concentration of hydrogen plus nitrogen in the recycle gas, thus keeping the recycle gas rate required at a low level.

The second stream of the divided high pressure separator 24 gas passes through line 28, and is combined with high pressure separator 24 liquid which is withdrawn from separator 24 through line 29. The mixture is passed through heater 30 and then entered into helium separator 32 through line 31. The liquid from helium separator 32 is withdrawn through line 33 and a pressure-reduc- valve and entered into cooler 34. The cooled stream passes through line 35 to low pressure separator 36. Substantially pure liquid ammonia from separator 36 is withdrawn through line 37, cooled, and passed to storage.

The vapor from low pressure separator 36 is passed through line 38 to cooler 39 and then through line 40 to drum 42. Condensed liquid ammonia is withdrawn from drum 42 through line 43 and joined to line 35 at the inlet of low pressure separator 36. The vapor from drum 42 flows through line 44 to water wash tower 45. Water enters this tower through line 46 and dissolves ammonia vapor in the gas. The aqua ammonia produced is withdrawn from the base of tower 45 through line 47. The vapor from wash tower 45 is withdrawn through line 48 and returned to steam reforming system 20 as previously described.

The vapor from helium separator 32 is withdrawn through line 49 and entered into crude helium purification system 50. The gas stream is cooled and entered into a drum. Condensed liquid ammonia is withdrawn from the drum and returned to the inlet of low pressure separator 36. The vapor from the drum is contacted with water in a wash tower to remove dissolved ammonia vapor from the gas. Aqua ammonia is withdrawn from the bottom of the wash tower. The vapor from the wash tower passes out of helium purification system 50 through line 51 as a crude helium stream suitable for further purification such as is described below. The high pressure separator and helium separator are actually two high pressure separators operated at different temperatures which, in independent manners, effectively control recycle gas quality and helium net gas quality.

Further purification of the crude helium stream can be accomplished by methods known and used in the art. Illustratively, the crude helium vapor from the helium wash tower is entered into a catalytic oxidizer unit. Oxygen of about 95 percent or higher purity is contacted with the gas stream under proper control to combust the hydrogen and methane without leaving an excess of oxygen in the effluent stream. To promote the reaction platium catalyst is employed in the oxidizer unit.

Effluent from the oxidizer unit is passed through a conventional carbon dioxide removal system, such as the monoethanolamine absorber system previously described. The carbon dioxide-free helium gas is compressed, passed through an oil filter and then dried. The resultant helium-bearing stream is passed to storage or submitted to final super-purification.

The following example illustrates a typical operation within the scope of the present invention. It is apparent that specific compositions of materials and conditions can be varied considerably without departing from the invention in its broadest interpretation.

*Example*

With reference to the drawing, well gas at a pressure of about 600 p.s.i.a. is passed into the process system at a rate providing the moles per hour flow of gas components as indicated below. After the gas has been treated to remove miscellaneous liquids and pipeline solids, it is contacted with monoethanolamine to remove carbon dioxide and hydrogen sulfide. The gas is then washed with aqueous sodium hydroxide solution, dried and compressed. After the heat of compression is removed and further cooling is effected, the gas stream is passed through line 11 into absorber tower 12. Liquid from absorber tower 12 passes through line 13 to desorber system 14. The material balance of the absorber system is indicated below.

| Line | 10 | 11 | 16 | 15a | Desorber bottoms |
|---|---|---|---|---|---|
| Component | Raw pipeline gas | Absorber feed gas | Absorber tail gas | Absorber lean oil | |
| Nitrogen | 3,452 | 3,452 | 3,452 | 0 | 0 |
| Hydrogen | 22 | 22 | 22 | 0 | 0 |
| Carbon dioxide | 22 | 0 | 0 | 0 | 0 |
| Helium | 110 | 110 | 110 | 0 | 0 |
| Methane | 16,535 | 16,535 | 4,150 | 0 | 12,385 |
| Ethane | 1,011 | 1,011 | 10 | 50 | 1,051 |
| Propane | 506 | 506 | 406 | 12,000 | 12,100 |
| Isobutane | 88 | 88 | 0 | 0 | 88 |
| n-Butane | 154 | 154 | 0 | 0 | 154 |
| Isopentane | 44 | 44 | 0 | 0 | 44 |
| n-Pentane | 22 | 22 | 0 | 0 | 22 |
| $C_6$ and higher | 22 | 22 | 0 | 0 | 22 |
| Total | 21,988 | 21,966 | 8,150 | 12,050 | 25,866 |

The desorber tower bottoms is passed to the de-ethanizer where most of the methane and ethane and some propane are passed overhead as a vapor stream. The de-ethanizer bottoms product is passed into the depropa-nizer tower. The material balance for the de-ethanizer and depropanizer systems is indicated below.

| Component | De-ethanizer | | Depropanizer | |
|---|---|---|---|---|
| | Overhead product | Bottoms | Net overhead (excluding lean oil) | Bottoms |
| Methane | 12,385 | 0 | 0 | 0 |
| Ethane | 1,001 | 50 | 0 | 0 |
| Propane | 100 | 12,000 | 0 | 0 |
| Isobutane | 0 | 88 | 0 | 88 |
| n-Butane | 0 | 154 | 0 | 154 |
| Isopentane | 0 | 44 | 0 | 44 |
| n-Pentane | 0 | 22 | 0 | 22 |
| $C_6$ and higher | 0 | 22 | 0 | 22 |
| Total | 13,486 | 12,380 | 0 | 330 |

Absorber tower 12 tail gas is withdrawn through line 16 through heat exchangers and entered into nitrogen tower 17. Net overhead vapor from nitrogen tower 17 is withdrawn through line 19. The nitrogen tower 17 bottoms is withdrawn through line 18. The following table indicates the material balance relating to the nitrogen tower and to the low pressure separator 36 recycle, which enters through line 48 and is combined with net nitrogen tower overhead vapor.

| Line | 18 | 19 | 48 |
|---|---|---|---|
| Component | Nitrogen tower bottoms | Nitrogen tower overhead | Low pressure separator recycle |
| Helium | 0 | 110 | 42 |
| Nitrogen | 2,696 | 756 | 34 |
| Hydrogen | 0 | 22 | 94 |
| Methane | 3,574 | 576 | 33 |
| Ethane | 10 | 0 | 0 |
| Propane | 406 | 0 | 0 |
| Total | 6,686 | 1,464 | 203 |

The nitrogen tower overhead product through line 19 is joined with steam and combined with ammonia synthesis system 22 recycle as previously described and entered into the steam reforming furnace. The reformed gas is treated in the shift reactor where, in the presence of added steam and promoted-iron catalyst, carbon monoxide is converted to carbon dioxide. The gas is then contacted with monoethanolamine in an absorber tower to remove carbon dioxide. The treated gas is withdrawn from the absorber tower and entered into a methanation unit where traces of carbon monoxide and carbon dioxide in the product gas are reacted with hydrogen in the presence of a nickel-containing catalyst to provide a stream suitable as ammonia synthesis feed gas. The material balance involved in the steam-methane reforming system is indicated below.

| Component | Total reformer feed | Reformer furnace effluent | Shift converter effluent | $CO_2$ removal effluent | Line 21 Methanator effluent (after compression) |
|---|---|---|---|---|---|
| Helium | 152 | 152 | 152 | 152 | 152 |
| Nitrogen | 790 | 790 | 790 | 790 | 790 |
| Hydrogen | 116 | 2,216 | 2,480 | 2,480 | 2,372 |
| Methane | 609 | 9 | 9 | 9 | 45 |
| Water | 2,500 | 1,600 | 1,336 | 35 | 1 |
| CO | 0 | 300 | 36 | 36 | 0 |
| $CO_2$ | 0 | 300 | 564 | 0 | 0 |
| Total | 4,167 | 5,367 | 5,362 | 3,502 | 3,360 |

The gas stream from the reforming system is entered into ammonia synthesis system 22. Ammonia synthesis effluent gas in line 23 is entered into high pressure separator 24. In the separator, the vapor is separated from the liquid and passes out through line 25 where it is split into two separate streams. The first stream passes through line 27 and is recycled to ammonia synthesis system 22. The second stream is combined with high pressure separator 24 liquid from line 29, heated and entered into helium separator 32 through line 31. The material balance of the ammonia synthesis system 22 and high pressure separator 24 is indicated below:

| Line | 27 | 31 | 28 | 29 |
|---|---|---|---|---|
| Component | Ammonia unit recycle gas | Net synthesis effluent | High-pressure separator | |
| | | | Net vapor | Net liquid |
| Helium | 337 | 152 | 131 | 21 |
| Nitrogen | 80 | 50 | 31 | 19 |
| Hydrogen | 252 | 150 | 98 | 52 |
| Methane | 61 | 45 | 23 | 22 |
| Ammonia | 20 | 1,480 | 8 | 1,472 |
| Water | 0 | 1 | 0 | 1 |
| Total | 750 | 1,878 | 291 | 1,587 |

The liquid from helium separator 32 is withdrawn through line 33, cooled and entered into low pressure separator 36. The liquid from separator 36 is withdrawn through line 37 as substantially pure ammonia. The vapor from separator 36 is withdrawn through line 38 and passed on through cooler 39 to drum 42. Condensed ammonia from drum 42 flows through line 43 to the inlet of separator 36. The vapor from drum 42 flows through line 44 to wash tower 45 where ammonia vapor is washed out of the gas. The aqua ammonia produced is withdrawn through line 47. The vapor from wash tower 45 is passed out through line 48 and is returned to the steam reforming unit as previously described.

The vapor from the helium separator is withdrawn through line 49, washed with water to remove ammonia vapor, and passed out of the system as a crude helium stream suitable for further purification as previously described. The material balance of the helium separator and the low pressure separator is indicated below:

| Line | 49 | 33 | 38 | 37 |
|---|---|---|---|---|
| Component | Helium separator | | Low-pressure separator | |
| | Net vapor | Net liquid | Net vapor | Net liquid |
| Helium | 110 | 42 | 42 | 0 |
| Nitrogen | 14 | 36 | 34 | 2 |
| Hydrogen | 53 | 97 | 94 | 3 |
| Methane | 9 | 36 | 33 | 3 |
| Ammonia | 20 | 460 | 46 | 1,414 |
| Water | 0 | 1 | 0 | 1 |
| Total | 206 | 1,672 | 249 | 1,423 |

In the treatment of natural gas as described in the above example, the raw gas stream at wellhead pressure is entered into invention purification system at a rate of about 22,000 total gas moles per hour. In the feed preparation system well brine, hydrocarbon liquid, pipeline solids and other miscellaneous materials are removed.

The natural gas is contacted with monoethanolamine at a temperature of between about 40° F. and 180° F. Carbon dioxide removal can be accomplished with water or with diethanolamine, triethanolamine, caustic and other conventional alkaline materials. The carbon dioxide-free gas is contacted with activated alumina or other standard drying agent. The dried gas is compressed to a pressure between 500 and 1,500 p.s.i.a. and passed into absorber tower 12. The feed gas in the absorber system is at a temperature of between about 0° F. and −150° F. when entered into the absorber tower and the lean oil is employed at a temperature of between about 0° F. and −200° F. Lean oil composition may range from propane with less than 5 percent each of ethane or butane to mixtures containing as much as 25 percent ethane or 60 percent butane. The rich oil flowing from the absorber tower to the desorber tower is maintained at a temperature of between about 125° F. and 225° F. gas passes out of the absorber at a temperature of between about 10° F. and −190° F.

The rich oil enters into the desorber tower at a pressure of between 400 and 1,400 p.s.i.a. The overhead vapor ensuing from the desorber tower has a temperature of between about −40° F. and −120° F. and the desorber tower bottom pass out of the desorber at a temperature of between about −30° F. and −110° F.

Desorber bottoms is passed into the de-ethanizer tower at a pressure of between about 200 and 600 p.s.i.a. The vapors from the de-ethanizer tower are withdrawn at a temperature of between about −50° F. and −150° F. and the bottoms from the tower are maintained at a temperature of between about 125° F. and 225 F.

The de-ethanizer bottoms enters the depropanizer tower at a pressure of between about 175 and 300 p.s.i.a. The depropanizer overhead vapor is withdrawn at a temperature of between about 85° F. and 130° F. and the bottoms are withdrawn at a temperature of between about 150° F. and 260° F.

In nitrogen-hydrocarbon rejection system 17 the nitrogen tower pressure is maintained at between about 200 and 800 p.s.i.a. The overhead vapor product from the nitrogen tower is withdrawn at a temperature between about −100° F. and −300° F. and the bottoms are withdrawn at a temperature of between about −100° F. and −250° F.

The feed gas pressure in steam-methane reforming system 20 is between about 100 and 400 p.s.i.a. Nickel oxide is the preferred catalyst in the reforming furnace. The space velocity in the furnace is between 2,000 and 4,000 s.c.f./h. theoretical hydrogen per cubic foot of catalyst. Steam is employed at a ratio of between about 3 to 1 and 6 to 1 moles of water per atom of carbon. The reformed gas passes out of the reforming furnace at a temperature of about 1400° F. to 1800° F. and a pressure of between about 50 and 300 p.s.i.a.

The catalyst in the shift converter is preferably chromium-promoted iron dioxide. Steam is introduced into the converter to provide between about 0 and 2 moles of water per atom of carbon. The gas stream is withdrawn from the shift converter at a temperature in the range between about 650° F. and 850° F. and a pressure between about 50 and 300 p.s.i.a. After the converter treatment the carbon dioxide in the gas stream is removed in a conventional monoethanolamine absorber - regenerator system. The carbon dioxide pickup ratio is approximately 3 to 5 s.c.f. carbon dioxide per gallon of monoethanolamine. The average conditions in the monoethanolamine absorber are a temperature between about 40° F. and 180° F. and a pressure between about 200 and 600 p.s.i.a.

The catalyst in the methanation system preferably contains nickel as the active agent. The space velocity of the gas stream through the methanation system is between about 2,000 and 8,000 s.c.f/h. gas per cubic foot of catalyst. The outlet conditions of the methanation system are a temperature between about 500° F. to 700° F. and a pressure of about 200 and 600 p.s.i.a.

High pressure separator 24 is operated at a pressure between about 6,000 and 20,000 p.s.i.a. and a temperature between about 40° F. and 150° F. The recycle gas from the high pressure separator varies in quantity from 0 to about 55 percent of the moles of ammonia synthesis feed gas. The preferred catalyst for the ammonia synthesis converter is iron oxide promoted with alkali oxide. The space velocity of the gas stream through the converter is between about 20,000 to 50,000 s.c.f./h. of exit gas per cubic foot of catalyst. The first converter temperature is between about 800° F. and 1200° F. and the second converter outlet temperature is between 800° F. and 1200°F.

The helium separator 32 is operated at a pressure between about 6000 and 20,000 p.s.i.a. and a temperature between about 130° F. and 230° F.

The low pressure separator 36 is operated at a pressure between about 200 and 2,000 p.s.i.a. and a temperature between about −40° F. and 155° F.

As mentioned previously, the crude helium withdrawn from the system through line 51 is suitable for further purification. The crude helium feed stream consists of the net purge vapor from the process plus liquid ammonia with dissolved gas from high pressure separator 24 in the ammonia synthesis system. The ammonia is removed with a water wash at a temperature between about 40° F. and 100° F. and a pressure between about 500 and 2,000 p.s.i.a. The washed helium-bearing gas stream is passed into a catalytic oxidation reaction system preferably containing platinum as the active agent to remove hydrogen and hydrocarbon components from the gas stream by oxidation. Carbon dioxide and water are removed with a conventional monoethanolamine system preceded by cooler and water separator drums. The resultant helium rich gas stream is subjected to a final drying over activated alumina desiccant beds.

What is claimed is:

1. In a process for recovering helium from natural gas, the steps which comprise contacting natural gas with liquid hydrocarbon oil which is substantially propane in an absorption zone to remove higher hydrocarbons and a substantial portion of methane from the gas stream, cooling and fractionating said gas stream to remove a substantial portion of the nitrogen component and reduce the hydrocarbon content to a minor amount of methane in the gas stream, subjecting said gas stream to stream reforming conditions to increase the hydrogen content of the gas stream, contacting said gas stream with ammonia synthesis catalyst under conditions producing liquid ammonia, and flashing the liquid ammonia to recover helium dissolved therein.

2. The process of claim 1 wherein said cooling and fractionation step is controlled to provide the optimum ratio of nitrogen to hydrogen for the ammonia synthesis step.

3. In a process for recovering helium from natural gas, the steps which comprise contacting natural gas with liquid hydrocarbon oil which is substantially propane in an absorption zone to remove higher hydrocarbons and a substantial portion of methane from the gas stream, cooling and fractionating said gas stream to remove a substantial portion of the nitrogen component and reduce the hydrocarbon content to a minor amount of methane in the gas stream, subjecting said gas stream to steam reforming conditions to increase the hydrogen content of the gas stream, contacting said gas stream with ammonia synthesis catalyst under conditions producing liquid ammonia, flashing the liquid ammonia to produce a helium-rich vapor phase separate from said liquid ammonia, recycling a portion of said vapor phase to the ammonia synthesis system, contacting the remainder of said helium-rich phase as net purge gas with the said liquid ammonia phase to remove diluent components and thereby providing a higher helium content in the resulting gas stream.

4. The process of claim 3 wherein the dissolved gaseous diluent components are flashed from the liquid ammonia wash phase and recycled to the steam reforming system.

References Cited by the Examiner

UNITED STATES PATENTS

| | | | |
|---|---|---|---|
| 1,658,631 | 2/28 | Dannenbaum | 23—209 |
| 1,875,926 | 9/52 | Hughes | 23—199 |
| 2,610,106 | 9/52 | Gray | 23—199 |
| 3,088,919 | 5/63 | Brown et al. | 23—2 X |

OTHER REFERENCES

Mellor: "Comprehensive Treatise on Inorganic and Theoretical Chemistry," vol. 7, pages 893, 895.

MAURICE A. BRINDISI, *Primary Examiner.*